Jan. 7, 1958 J. B. KUCERA 2,818,930
THREE-WHEELED VEHICLE HAVING A HIGH ARCHED FRONT FRAME
Original Filed Aug. 7, 1948 2 Sheets-Sheet 1
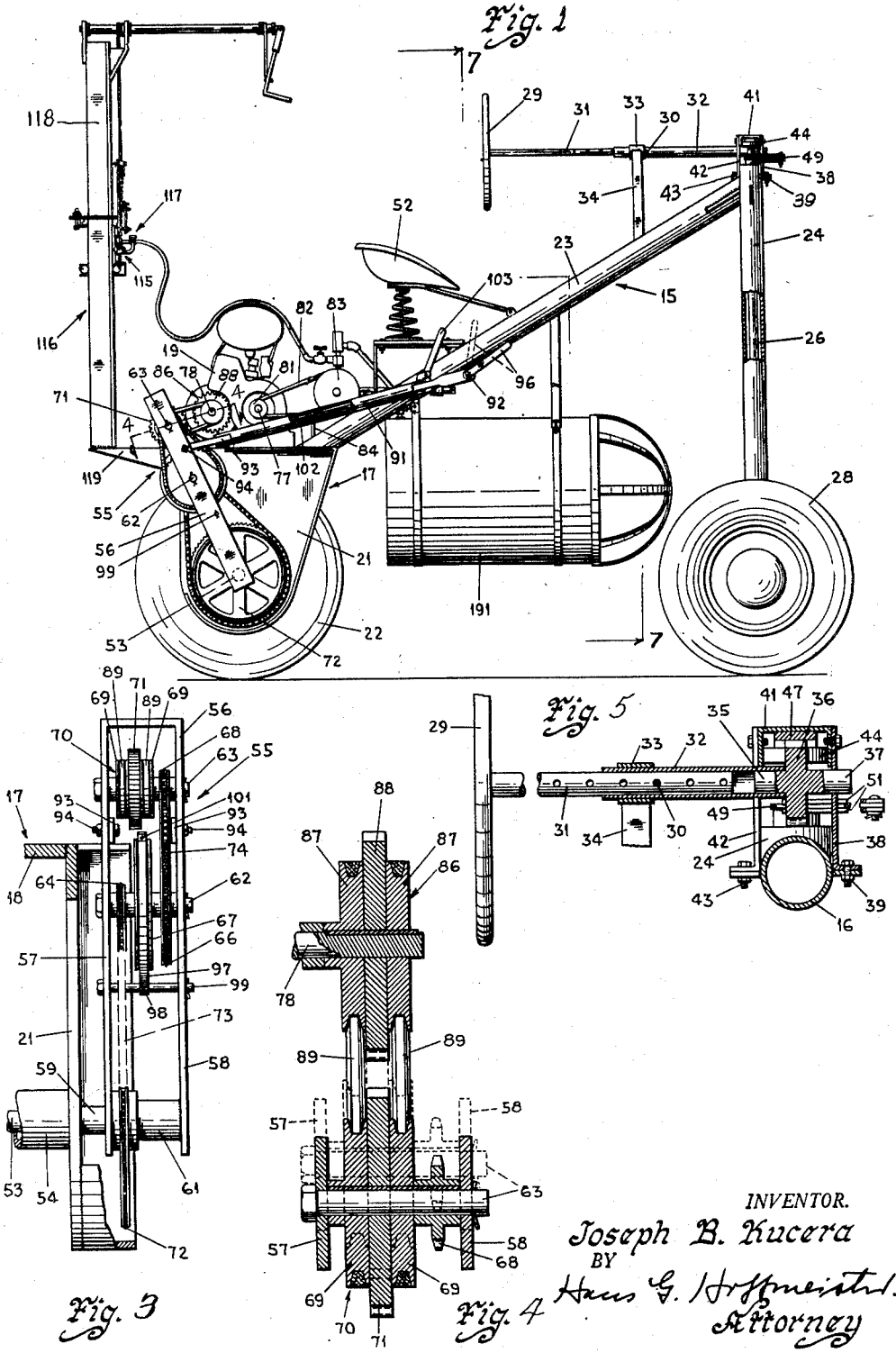
INVENTOR.
Joseph B. Kucera Jan. 7, 1958 J. B. KUCERA 2,818,930
THREE-WHEELED VEHICLE HAVING A HIGH ARCHED FRONT FRAME
Original Filed Aug. 7, 1948 2 Sheets-Sheet 2
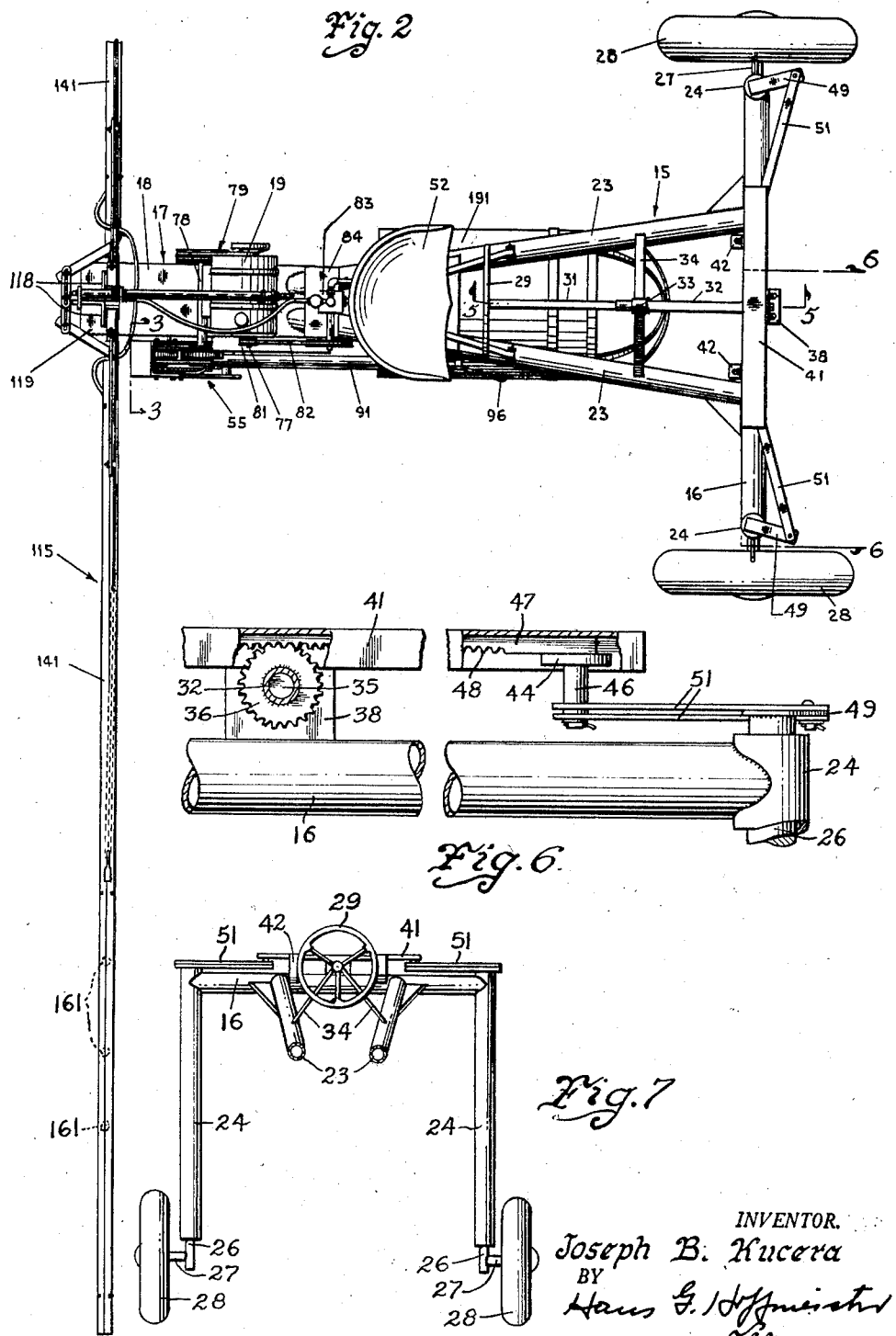
INVENTOR.
Joseph B. Kucera
BY
Hans G. Hoffmeister
Attorney United States Patent Office 2,818,930
Patented Jan. 7, 1958

2,818,930

THREE-WHEELED VEHICLE HAVING A HIGH ARCHED FRONT FRAME

Joseph B. Kucera, Traer, Iowa

Original application August 7, 1948, Serial No. 43,086, now Patent No. 2,647,795, dated August 4, 1953. Divided and this application May 19, 1953, Serial No. 355,944

4 Claims. (Cl. 180—25)

The present invention relates to vehicles and more particularly to vehicles of the high-clearance type.

This application is a division of my copending application Serial No. 43,086, filed August 7, 1948, for Plant Spraying Machine, and since issued as Patent No. 2,647,795.

One object of my invention is to provide a vehicle of the high-clearance type especially designed and particularly adapted for agricultural purposes and varied farm uses.

It is also an object to provide a vehicle of the high-clearance type having an extremely low center of gravity.

Another object is to provide a self-propelled, high-clearance type of vehicle having great stability.

It is still another object to provide a vehicle of the type referred to, which may be easily and safely operated.

An additional object is to provide a vehicle of the type referred to, which with the minimum expenditure of power, will operate effectively and efficiently either on hill sides and/or soft ground, and which will rapidly and readily extricate itself from chuck holes or the like when the same are encountered during vehicle operational periods.

A further object is to provide a vehicle of the type referred to, which is capable of turning in a relatively small radius to thus permit maneuvering of the vehicle in comparatively close quarters and under all sorts of farm conditions.

It is also a further object to provide a vehicle of the type referred to, which is particularly and specifically suited for employment as a carrier of crop spraying equipment.

A still further object is to provide a vehicle of the type referred to, which is capable of straddling adjacent crop rows, or of operating in any conventional spacing of crop rows, and which will travel down the field between such rows without damaging or injuring the crops.

It is yet a further object to provide a vehicle for high clearance cultivation, upon which the operator is seated at an elevation sufficiently high and toward the front of the vehicle, so that he may have an unobstructed view of the crop being cultivated and thereby have an opportunity to effectively and properly observe the operation performed on such crop, particularly when the latter is reaching a state of maturity.

It is also a further object to provide a vehicle of the type referred to wherein all vehicle controls are centralized at or adjacent the operator's seat and are readily accessible to the operator when he is seated upon the vehicle, to thus promote easy handling and efficient manipulation of the vehicle and the several appurtenances thereof.

It is still a further object to provide a vehicle of the type referred to, upon and/or to which many accessories or instrumentalities may be mounted or attached to perform their specific duties, as for example: crop dusters, detasselers, end gate seeders, front end loaders, two-row planters with fertilizer attachments, tote boxes, windrowers, etc., etc.

It is still a further object to provide a vehicle of the type referred to, which may on occasion be employed as a garden tractor, a portable power unit, a water transporter, an apparatus for side dressing crops, etc., etc.

Further objects, features and advantages of this invention will become apparent from the following description when taken in connection with the accompanying drawings, in which:

Fig. 1 is a side elevation view of the spraying machine of this invention with parts broken away to more clearly show its construction;

Fig. 2 is a plan view of the machine with the boom structure foreshortened;

Fig. 3 is an enlarged rear elevational view, as seen on the line 3—3 in Fig. 2, showing a part of the system for transmitting power to the machine traction wheel;

Fig. 4 is an enlarged sectional view of another part of the power transmission system taken along the line 4—4 in Fig. 1;

Fig. 5 is an enlarged foreshortened sectional view, as seen on the line 5—5 in Fig. 2, showing a part of the steering apparatus for the machine;

Fig. 6 is an enlarged and foreshortened detail view of the steering apparatus taken on the line 6—6 in Fig. 2, and having parts broken away for the purpose of clarity;

Fig. 7 is a vertical section taken along line 7—7 of Fig. 1 shown in a smaller scale.

With reference to the drawings, the spraying machine of this invention is illustrated in Figs. 1 and 2 as including a main frame, designated generally as 15, comprising a front cross or transverse frame member 16 of a tubular construction, and a rear support member 17 of a right angle shape having a horizontally extended leg 18, which constitutes a mounting base for a power unit 19, and an upright leg 21 which serves as a mounting support for a single rear traction wheel 22. Connected between the front frame member 16 and the forward end of the mounting base 18 are a pair of longitudinally extended tubular frame members 23, inclined upwardly and forwardly from the mounting base and diverging in a forward direction. Arranged at opposite ends of the transverse frame member 16 are a pair of downwardly projected tubular legs 24, each of which has a shaft 26 rotatably supported therein. The lower ends of the shafts 26 are equipped with laterally extended spindles 27 for carrying front steering wheels 28.

The steering mechanism for the front wheels 28 includes a steering wheel 29 (Figs. 1 and 5) carried on a shaft 31 adjustably supported for axial movement within a tube or sleeve member 32 which is rotatably supported in a bearing 33 carried on a frame 34 extended between the longitudinal frame members 23, of the main frame 15, at a position rearwardly of the transverse frame member 16. Axial adjustment of the shaft 31 is maintained by the provision of a pin 30 insertible through aligned holes formed in the shaft and the sleeve 32. Mounted within the front end of the tube or sleeve member 32 is a shaft 35 which carries a pinion gear 36. The forward end 37 of the shaft 35 is rotatable within an upright front bracket member 38 which is secured at 39 to the transverse frame member 16.

An inverted channel member 41 (Figs. 2 and 5) is supported in a spaced relation above the transverse frame member 16 by the front bracket 38 and a pair of oppositely arranged rear brackets 42 which are secured at 43 to the rear side of the transverse frame member 16. The channel 41 constitutes a track member for a pair of rollers 44 (Figs. 1, 5 and 6) mounted on pins 46 which are suitably supported at opposite ends of a rack bar 47, the teeth 48 of which face downwardly for meshing engagement with the top side of the pinion gear 36. Mounted on the upper ends of the shafts 26, for the front leg members 24, are forwardly extended rock arms 49 (Figs. 2 and 6). Links 51 are pivotally connected between the roller pins 46 and the free or forward ends of the rock arms 49.

The steering wheel 29 is located at a position forwardly of a machine operator seat 52 which is carried on the longitudinal frame members 23 at a position adjacent their rear ends. By merely removing the pin 30, the rod 31 is adjustably movable in a forward and rearward direction to a position which can be conveniently reached by the machine operator. On rotation of the steering wheel 29, to in turn provide for a rotation of the pinion gear 36, the rack 47 is guidably moved within the channel track 41, longitudinally of the transverse frame member 16, whereby the front wheel steering shafts 26 are rotated, through the links 51 and rock arms 49, to provide for a steering of the front wheels 28. As shown in Fig. 6, the links 51 are connected with the pivot pins 46 at a position below the channel track 41 to permit a free pivotal movement of the links 51 over the full steering range of the front wheels.

The rear traction wheel 22 is mounted on a shaft 53 (Figs. 1 and 3), which is rotatable in a hub or bearing 54 suitably carried on the inner side of the upright leg 21 of the rear support 17 and has a portion 59 extended outwardly from such leg. A power transmission system, designated generally as 55, includes a rockable frame 56 of a substantially inverted U-shape, having the lower or free ends of its legs 57 and 58 rotatably supported on the extended portion 59 of the rear wheel shaft 53, with the leg 58 being carried on a bearing 61 which fits over the end of the extended shaft portion 59. Supported between the legs 57 and 58 of the U-frame 56, are a pair of vertically spaced shafts 62 and 63, with the shaft 63 being positioned above the shaft 62.

Positioned on the lower shaft 62 are sprockets 64 and 66 and a V-belt pulley 67, with the pulley 67 being arranged between the sprockets 64 and 66. The upper shaft 63 carries a sprocket 68 and a combination V-belt pulley and gear unit 70 including a pair of V-belt pulleys 69 and a gear 71 arranged therebetween. A sprocket 72, mounted on the rear wheel shaft 53, is connected through a sprocket chain 73 with the sprocket 64 on the lower shaft 62. The other sprocket 66 on the lower shaft 62 is connected through a chain 74 with the sprocket 68 on the upper shaft 63. The shaft 63 functions as a drive shaft for driving the rear wheel shaft 53, with the shaft 62 acting as an idler shaft.

The power unit 19 illustrated is a commercially available type combustion engine having an engine shaft 77 (Fig. 2) and a drive shaft 78 connected together through a combination speed reduction and automatic clutch device, indicated generally at 79. One end of the engine shaft 77 carries a V-belt pulley 81 which is connected through a belt 82 with a hydraulic pump 83 forming part of the spraying mechanism of the machine of this invention. The pump 83 (Figs. 1 and 2) is mounted on a base member 84 that extends between the longitudinal frame members 23 at a position rearwardly of the operator's seat 52.

The drive shaft 78 (Figs. 1, 2 and 4) carries a combination unit 86, corresponding to the combination unit 70 on the shaft 63, and includes a pair of V-belt pulleys 87 having a gear member 88 arranged therebetween. V-belts 89 connect the pulleys 87 with the pulleys 69 on the shaft 63.

For a forward advance of the machine, the gears 71 and 88 are out of engagement and the pulleys 69 are connected in a driven relation with the pulleys 87 through the V-belts 89, and the combination unit 86 is rotated in a clockwise direction, as viewed in Fig. 1, to provide for a corresponding rotation of the rear wheel sprocket 72. When the machine is to be reversed, the U-frame 56 is pivotally moved or rocked in a forward direction, or to the right, as viewed in Fig. 1, whereby to move the gear 71 into engagement with the gear 88. On movement of the gear 71 into engagement with the gear 88, the belts 89 are released from frictional engagement with the pulleys 69 and 87. With the gear 88 rotating in a clockwise direction, as viewed in Fig. 1, the gear 71 is rotated in a counter-clockwise direction, as also viewed in Fig. 1, whereby the rear wheel sprocket 72 is driven in a reverse or counter-clockwise direction. A forward or reverse travel of the machine is thus accomplished in response to a forward and rearward pivotal movement of the U-frame 56.

This movement of the frame 56 is accomplished by the provision of means including a longitudinally extended tubular member 91 (Figs. 1 and 2) having its forward end eccentrically mounted at 92 on one of the longitudinal frame members 23 and its rear end equipped with bifurcations 93 for connection at 94 with the legs 57 and 58 of the U-frame 56, as best appears in Fig. 3. The eccentric mounting 92 is equipped with an actuating handle 96, such that when the handle 96 is in its full line position shown in Fig. 1, the gears 71 and 88 are out of engagement, and on movement of the handle 96 to its dotted line position, the frame 56 is rocked to move the gears 71 and 88 into engagement, as illustrated for the dotted line position of the gears in Fig. 4.

The V-belt pulley 67 on the lower or idler shaft 62 constitutes part of a brake system which includes further a V-belt portion 97 (Fig. 3) extended partially about the pulley 67 and having one end 98 attached to a pin 99 extended between the legs 57 and 58 of the U-frame 56, at a position below the idler shaft 62. The other end 101 of the brake belt 97 is attached to the rear end of an actuating rod 102 (Fig. 1) extended through the sleeve member 91 and movably conneced with a pivoted handle 103 mounted on the sleeve member 91. On pivotal movement of the handle 103, the brake belt 97 is moved into and out of frictional engagement with the V-pulley 67 to in turn provide for a braking and release of the rear traction wheel 22.

The spray mechanism of the machine, besides the pump 83, includes a boom structure, designated generally as 115 (Figs. 1 and 2) having two opposed laterally extending boom sections or supports 141 mounted on an elevator or carriage unit 117, which is guidably supported for up and down or vertical movement on an upright frame 116. The frame 116 has a pair of spaced upright angle members 118 supported at their lower ends on a rearward extension 119 for the horizontal leg 18 of the angle shaped support member 17. The spray mechanism is fully described in the above-mentioned patent.

A suitable spraying fluid is supplied under pressure to nozzles 161 from a fluid reservoir 191 (Fig. 1) suspended from the longitudinal frame members 23 at a position substantially below the machine operator seat 52, so that the top side of the reservoir 191 may be used as a foot support by the machine operator. The manner in which the spraying fluid is supplied under pressure to the nozzles 116 from the reservoir 191 is disclosed fully in the aforementioned patent.

From a consideration of the above description, it is seen that the invention provides a spraying machine of a simple and compact construction, which is fully operated by the machine operator while in a seated position. Further, the machine is readily maneuverable and under full control of the machine operator at all times.

Although the invention has been described with respect to a preferred embodiment thereof, it is to be understood that it is not to be so limited since changes can be made therein which are within the full intended scope of this invention, as defined by the appended claims.

I claim:

1. A vehicle comprising a frame having a transverse upright front frame section of an inverted U-shape, steerable front wheels at the lower free ends of the legs thereof, an inclined longitudinal frame section connected at it upper end with the base portion of said U-shaped front frame section, a support member extended rearwardly from the lower end of said longitudinal frame section having a horizontal portion and a vertical leg depending from said horizontal portion, traction means disposed beneath said horizontal portion and operably supported on said vertical leg, an engine mounted on the upper surface of said horizontal portion of said support member, and power transmission means connecting said traction means with said engine.

2. A vehicle comprising a transverse, upright, front frame section of an inverted U-shape, steerable front wheels at the lower free ends of the legs of said front frame section, an inclined longitudinal frame section connected at its upper end with the base portion of said U-shaped front frame section, a support member secured to and extending rearwardly from the lower end of said longitudinal frame section, said support member having a horizontal portion and a vertical leg depending from said horizontal portion, a traction wheel disposed beneath said horizontal portion and rotatably supported upon one side of said vertical leg, an engine mounted upon the upper surface of said horizontal portion of said support member, and a power transmission mounted upon the opposite side of said vertical leg from said traction wheel and adapted to operably connect the traction wheel with said engine.

3. In a vehicle adaptable for use for movement among rows of tall crops, a high arched end frame, said arched frame comprising a pair of legs, a laterally extending member interconnecting said legs at the upper ends thereof, a steerable support wheel mounted on each of said legs, vehicle steering means connected to said laterally extending member of said arched frame enabling said means to control the movement of said steerable wheels, an inclined longitudinal frame centrally positioned and inwardly disposed from the extremities of said laterally extending member, said longitudinal frame throughout the entire length thereof being inclined and converged downwardly from said arched frame, a support member extended rearwardly from the lower end of said longitudinal frame having a horizontal portion and a depending leg, a traction wheel operably supported on said depending leg, and an engine mounted on the horizontal portion of said support member and above said traction wheel for impelling said traction wheel.

4. In a vehicle adaptable for use for movement among rows of tall crops, a high arched end frame, said arched frame comprising a pair of legs, a laterally extending member interconnecting said legs at the upper ends thereof, a steerable support wheel mounted on each of said legs, vehicle steering means connected to said laterally extending member of said arched frame enabling said means to control the movement of said steerable wheels, an inclined longitudinal frame centrally positioned and inwardly disposed from the extremities of said laterally extending member, said longitudinal frame throughout the entire length thereof being inclined and converged downwardly from said arched frame, a support member extended rearwardly from the lower end of said longitudinal frame having a horizontal portion and a depending leg, a traction wheel operably supported on said depending leg, an engine mounted on the horizontal portion of said support member and above said traction wheel for impelling said traction wheel, a fluid reservoir supported by said longitudinal frame, and an operator's seat for said vehicle carried by said longitudinal frame at a position above and contiguous to said reservoir so that the latter will provide a foot support for the vehicle operator.

References Cited in the file of this patent

UNITED STATES PATENTS

| 953,325 | Foltin | Mar. 29, 1910 |
| 965,014 | Riblet | July 19, 1910 |
| 1,089,145 | McDonald | Mar. 3, 1914 |
| 1,158,202 | Glenn | Oct. 26, 1915 |
| 1,176,464 | King et al. | Mar. 21, 1916 |
| 1,918,221 | Weber et al. | July 11, 1933 |
| 2,066,666 | Becker | Jan. 5, 1937 |
| 2,236,317 | Howland | Mar. 25, 1941 |
| 2,504,403 | Finley | Apr. 18, 1950 |
| 2,508,605 | Hogie et al. | May 23, 1950 |
| 2,530,941 | Devirian | Nov. 21, 1950 |

FOREIGN PATENTS

| 399,791 | France | July 7, 1909 |
| 734,174 | France | July 25, 1932 |